US009194933B2

(12) United States Patent
Tidd et al.

(10) Patent No.: US 9,194,933 B2
(45) Date of Patent: *Nov. 24, 2015

(54) CONTEXT AND MAP AIDING FOR SELF-LEARNING

(71) Applicant: Cambridge Silicon Radio Limited, Cambridge (GB)

(72) Inventors: James Burgess Tidd, Stockholm (SE); Murray Robert Jarvis, Stapleford (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,295

(22) Filed: Nov. 4, 2014

(65) Prior Publication Data
US 2015/0057031 A1    Feb. 26, 2015

Related U.S. Application Data

(63) Continuation of application No. 13/606,172, filed on Sep. 7, 2012, now Pat. No. 8,909,258.

(51) Int. Cl.
   *H04W 24/00*   (2009.01)
   *G01S 5/02*   (2010.01)
   *H04W 64/00*   (2009.01)

(52) U.S. Cl.
   CPC ............. *G01S 5/0242* (2013.01); *H04W 64/00* (2013.01); *H04W 64/003* (2013.01); *G01S 5/0263* (2013.01)

(58) Field of Classification Search
   USPC ............................ 455/456.1, 456.5; 370/252
   See application file for complete search history.

(56) References Cited

U.S. PATENT DOCUMENTS

| 7,035,650 | B1 | 4/2006 | Moskowitz et al. |
|---|---|---|---|
| 8,036,679 | B1 | 10/2011 | Barbeau et al. |
| 8,611,247 | B2 | 12/2013 | Lakhzouri et al. |
| 2004/0061646 | A1 | 4/2004 | Andrews et al. |
| 2005/0064879 | A1 | 3/2005 | McAvoy |
| 2005/0227703 | A1 | 10/2005 | Cheng |
| 2005/0233748 | A1 | 10/2005 | Robinson et al. |
| 2006/0009235 | A1 | 1/2006 | Sheynblat et al. |
| 2006/0217131 | A1 | 9/2006 | Alizadeh-Shabdiz et al. |

(Continued)

FOREIGN PATENT DOCUMENTS

| EP | 2219401 | 8/2010 |
|---|---|---|
| EP | 2629576 | 8/2013 |

(Continued)

OTHER PUBLICATIONS

"U-TDOA", Wikipedia, the free encyclopedia, http://en.wilipedia.org/wiki/U-TDOA, Jan. 26, 2012.

(Continued)

*Primary Examiner* — David Q Nguyen
(74) *Attorney, Agent, or Firm* — The Marbury Law Group, PLLC

(57) ABSTRACT

A system and method for determining locations of a plurality of radio frequency (RF) signal sources. The method includes receiving RF signals from the RF signal sources, and determining locations of the RF signal sources based on the received RF signals. The method also includes determining an anchor having an absolute location identified by map data, and then adjusting the determined locations of the RF signal sources based on the anchor.

20 Claims, 6 Drawing Sheets

(56) References Cited

U.S. PATENT DOCUMENTS

| | | |
|---|---|---|
| 2007/0001867 A1 | 1/2007 | Rowe et al. |
| 2009/0275344 A1 | 11/2009 | Carlson et al. |
| 2009/0286551 A1 | 11/2009 | Kennedy et al. |
| 2010/0312473 A1 | 12/2010 | Hoshizaki |
| 2011/0043406 A1 | 2/2011 | Duffett-Smith et al. |
| 2011/0059752 A1* | 3/2011 | Garin et al. ............... 455/456.1 |
| 2011/0285591 A1 | 11/2011 | Wong |
| 2012/0028654 A1 | 2/2012 | Gupta et al. |
| 2012/0052883 A1 | 3/2012 | Austin et al. |
| 2012/0281584 A1 | 11/2012 | Powers et al. |
| 2013/0017842 A1 | 1/2013 | Gupta et al. |
| 2013/0230208 A1 | 9/2013 | Gupta et al. |

FOREIGN PATENT DOCUMENTS

| | | |
|---|---|---|
| WO | WO 2005/004528 | 1/2005 |
| WO | WO 2012/035190 | 3/2012 |

OTHER PUBLICATIONS

"E-OTD", Wikipedia, the free encyclopedia, http://en.wilipedia.org/wiki/E-OTD , Apr. 21, 2012.

Office Action for U.S. Appl. No. 13/533,349, filed Jun. 26, 2012, mailed Apr. 24, 2014.

GB Search Report for GB Application No. 1307922.3 dated Mar. 21, 2014.

Office Action for U.S. Appl. No. 13/689,933, dated May 5, 2015.

* cited by examiner

CONTEXT AND MAP AIDING FOR SELF-LEARNING

CROSS REFERENCE TO RELATED APPLICATIONS

This application is a Continuation application of U.S. patent application Ser. No. 13/606,172, filed Sep. 7, 2012, the contents of such application being incorporated by reference herein.

The present invention is directed to a system and method for aiding the location determination of access points and collector devices with unknown or relative locations. In general, a learning algorithm (e.g. implemented on a centralized server) uses map based context information determined by the collector device. Locations of map based information are then used by the server in communication with the collector device to determine or adjust the locations of the access points. These adjusted access point locations may be then used to determine a more accurate location of the collector device and other collector devices.

BACKGROUND

It is desirable to know the physical location of wireless transmitters (i.e. access points) in order to determined locations of mobile devices. Determining absolute locations of certain wireless transmitters (especially indoor transmitters), however, may be difficult. This difficulty may introduce error in the estimated location of the wireless transmitters and ultimately the estimated location of the mobile devices which use the wireless transmitters for positioning purposes.

SUMMARY OF THE INVENTION

A system and method for determining locations of a plurality of radio frequency (RF) signal sources. The method includes receiving RF signals from the RF signal sources, and determining locations of the RF signal sources based on the received RF signals. The method also includes determining an anchor having an absolute location identified by map data, and then adjusting the determined locations of the RF signal sources based on the anchor.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1A:
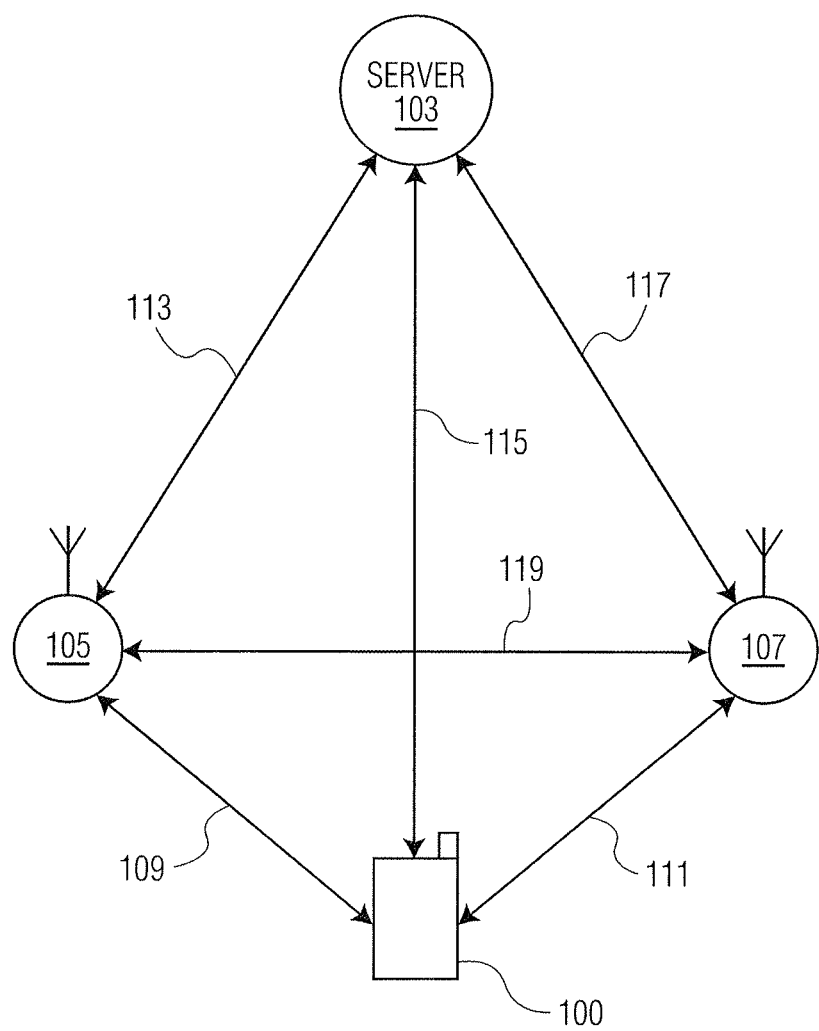
FIG. 1A is a block diagram showing communication between a collector device, access points and a server, according to an embodiment of the present invention.

FIG. 1A shows an example of a communication network including collector device 100, access points 105 and 107 and centralized server 103. In general, these devices communicate with each other via communication paths 109, 111, 113, 115, 117 and 119 respectively. Although only one collector device, one server and two access points are shown, it is contemplated that the communication network could include a plurality of collector devices, a plurality of access points and a plurality of, servers.

It is also noted that paths 113, 115 and 117 may be optional in embodiments where server 103 is not utilized. Furthermore, paths 109 and 111 may also be uni-directional in embodiments where device 100 receives signals from the access points but does not transmit signals to the access points.

In general, collector device 100 (e.g. a mobile telephone) travels in proximity to access points 105 and 107 (e.g. Wi-Fi access points that provide access to other devices, computers and severs over local networks and the internet). Collector device 100 attempts to determine its location based on its previously known location and signals received from access points 105 and 107 and signals generated by internal sensors.

In one example, collector device 100 may measure received signal strengths from RF signals transmitted by the access points. These measurements along with other measurements from other access devices and from motion and environmental sensors may then be transmitted to centralized server 103 which determines the absolute positions of the access points. This process of determining the absolute locations of the access points is known as relative harvesting, and is described in co-pending U.S. application Ser. No. 13/533,349 which is incorporated herein by reference.

In one example, collector device 100 may be monitoring RF signals transmitted by multiple access points (e.g., Wi-Fi and/or other RF transmitters). The collector device 100 may then identify each of the access points. As collector device 100 travels along a path, its location may be estimated using pedestrian dead reckoning (PDR). In one example, PDR is implemented by computing a relative displacement from an initially known location to other estimated locations along the path. Displacement between the locations may be determined based on various measurements of the transmitted access point RF signals (e.g. received signal strength indication (RSSI), time or phase offsets of received signals and/or round trip delay time (RTT)).

In general, data collection by collector device 100 may be performed at various points along the path and then transmitted from collector device 100 to server 103 (i.e. displacement information, signal strength information and identification information may be transmitted to the server). Server 103 may then process this received data to determine the absolute locations of the access points along the path.

In one example, collector device 100 may be traveling along a path within a building. In the building, wireless access points may be transmitting RF signals. Collector device 100, at various locations along a path, monitors the received RF signals transmitted from the access points. By using the various measurements described above collector device 100 is able to compute a displacement between the various locations along the path based on an initially known absolute location (i.e. an anchor). In one example, the anchor could be the last computed absolute position of collector device 100 (e.g. the last GPS fix before entering the building).

Collector device 100 may then transmit the collected data (i.e. displacement information, signal strength information and identification information) to server 103. Server 103 may then compute the absolute positions of the access points in an attempt to map the overall positioning network. These absolute positions of the access points are then transmitted to collector device 100 and other collector devices in the network. Collector device 100 may then use the absolute locations of the access points to more accurately determine its current location (i.e. RF signal strength received from the access point as well as the absolute access point location computed by the server could be used to determine the absolute location of the collector device).

Based on the absolute position information obtained when the collector device 100 was at the last GPS fix, the signal characteristic measurements at the points along the path and the displacement measurements, the server 103 can estimate locations for the points along the path. Using these positions, the server 103 can then estimate the positions of the access points by performing respective weighted centroid calculations using the signal characteristic measurements at the points along the path. Thus, it may obtain an estimate of the relative positions of the access points. It is noted that, according to one example embodiment, these centroid measurements are not used as the locations of the access points but are merely starting points for a calculation that determines the position more accurately, based on crowd-sourced information. The calculated positions of the points along the path as well as the centroid positions of access points are only estimates because, for example, the collectors device 100 may not always have a clear signal path to the access points so the signal characteristic at one or more of the points along the path may be attenuated. In addition, if RUT or arrival time is used as a signal characteristic, the value calculated by the collector device 100 may be erroneous due to multipath. Furthermore, the sensor data for a particular device may not be properly calibrated. Crowd-sourcing is used as described below, to refine these estimates by combining multiple estimates from multiple collector devices 100, taken at different times and different locations.

In an example embodiment, estimating the access point location is formulated as a cost function minimization (which can be mapped to Maximum Likelihood) based on two terms. The first term is a sum over every Wi-Fi observation. This locates the access points in the regions having signal characteristics with high confidence levels. The second term ensures that the estimated true locations where the scans were made do not violate the constraints imposed by the absolute and relative harvesting. It is a sum over all the constraints present. The cost function is shown in Equation (1):

$$E = \Sigma_n(\underline{A}_{i[n]} - \underline{U}_{j[n]})^2 w^2(RSSI_n) + \Sigma_c(\underline{U}_{k[c]} - \delta_{c,R} \underline{U}_{l[c]} - \Delta_c)^T \Sigma_c^{-1}(\underline{U}_{k[c]} - \delta_{c,R} \underline{U}_{l[c]} - \Delta_c) \quad (1)$$

Where: $\underline{U}$ is the estimated location (e.g. x,y,z vector) at which a scan observation was made (i.e. an estimated location of a collector device 104); $\underline{A}$ is the estimated position of an access point; n is a sum over all observations of access points; c is a sum over all constraints (omitted for absolute locations); $\delta_{c,R}$ selects presence or absence of this variable according to whether the constraint is relative or absolute (e.g. Kronecker delta); $\Delta_c$, for absolute constraints, is the measured location and for relative constraint is the measured delta; i[n], j[n], k[c], l[c] are mappings from the observations and constraints to the relevant locations of the access points and points where the collector devices made the observations (i.e. A's and U's); $w^2(RSSI_n)$ is a weighting for an observation, which may be, for example a function of the signal strength (RSSI) of the monitored access point signal; $\Sigma^{-1}$ is a weighting for a constraint (in the example, this is a 3×3 matrix for each constraint); and T is the transpose of the vector. If RTT or some other measure of signal timing were used as a characteristic of the access points, an additional term may be added to the cost function to accommodate the variation in signal timing.

The above example cost function contains three variables for three unknown access point locations and three for each unknown collector device position at which a scan was obtained. Typically this is therefore a minimization problem with hundreds, or thousands of unknowns. It is nevertheless tractable as the cost function and gradient are straightforward to calculate.

It is desirable to start the minimization from a good initial point. This may be obtained, for example, using the weighted centroids, described above, to obtain initial estimates of the access point locations and/or by iteratively solving sub-parts of the above problem. Additional outlier rejection checks may be applied at this stage based on the estimated locations obtained from the initial seed calculation.

The example cost function does not use the strictly quadratic (and consequently implied Gaussian) form above but may moderate its form for large errors by changing from quadratic to linear and then constant as the error increases. This process known is known as fat-tailing and flat-tailing.

Uncertainty (equivalently confidence/covariance) in the solution is obtained from the curvature of the cost function at the minimum. The Hessian matrix can be evaluated at the cost function minimum and its inverse yields the covariance matrix. Due to the large number of dimensions this may be an expensive operation. This may be addressed by exploiting the dominantly local nature of the contributors (effectively the sparseness of the matrix) to allow the problem to be split into a series of smaller computationally cheaper calculations, each using a respective portion of the matrix.

Fingerprinting is a method that uses a model of the propagation pattern of each access point 105 and 107 to determine the likely location of a collector device 100. If the fingerprint of an access point were used as its positioning data, the model may be initialized with estimated position points in the area and their corresponding signal characteristic measurements. The cost function described above in equation (1) may be modified to minimize differences between the observations and the fingerprint model.

If additional anchors (i.e. absolute positions other than the last known GPS fix) within the building are able to be determined by collector device 100, then the overall accuracy of the harvesting would increase since these absolute positions could be included in the above described cost function. One way to determine additional anchors within the building is to utilize map information. In general, information of the architectural layout of the building (which is already known) may be utilized by server 103 in order to more accurately determine the location of collector device 100 and the locations of the access points.

Figure 1B:
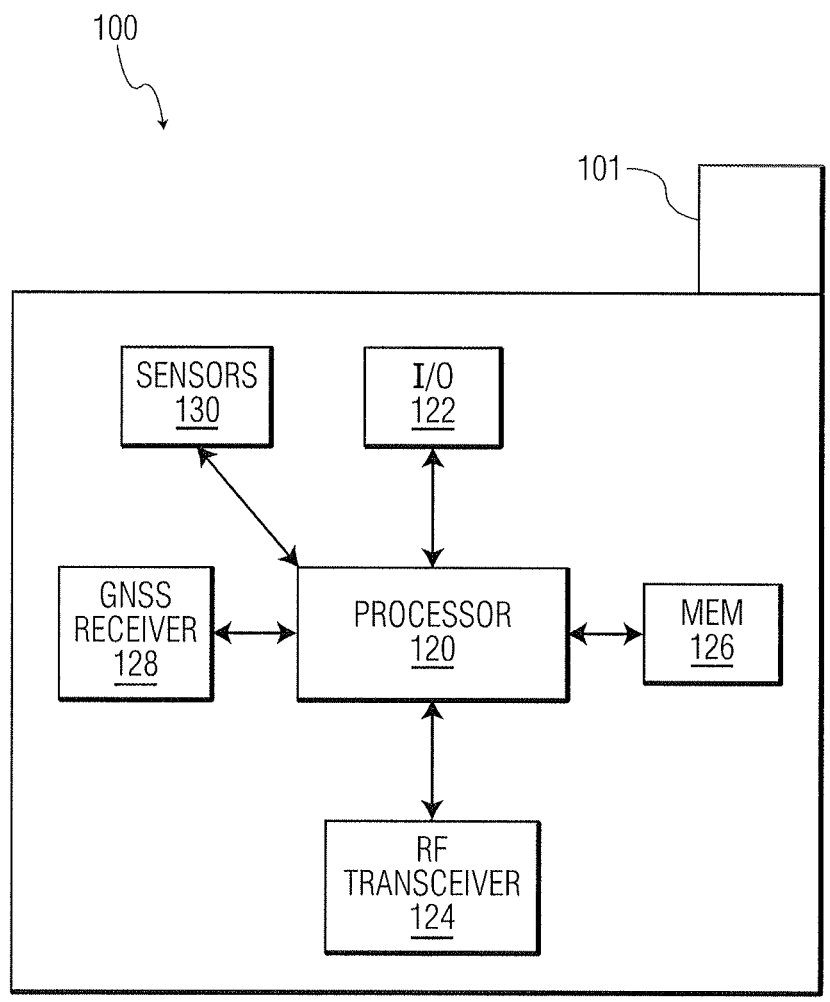
FIG. 1B is a block diagram of a collector device, according to an embodiment of the present invention.

FIG. 1B shows an example of collector device 100 which may be embodied as a mobile device (e.g. a mobile telephone). Collector device 100 may include a processor 120 for controlling various other hardware or software modules. In one example, collector device 100 may include input and output devices (i.e., keypad and display, not shown), memory 126, RF transceiver device 124 (e.g. WiFi transceiver), a global navigation satellite system (GNSS) receiver 128, and internal sensors 130 (e.g. of an accelerometer, gyroscope, pedometer, barometer, magnetometer, microphone and camera).

In one example, the RF transceiver 124 may be able to transmit and receive in various IEEE 802.11 standards. The GNSS receiver 128 may also be able to receive satellite signals, for example, from global positioning system (GPS) satellites. Both the GNSS receiver and the RF transceiver 124 may utilize antenna 101 which may be a common antenna or separate dedicated antennas for transmitting and receiving in specific frequency bands.

In one embodiment, collector device 100 may utilize internal sensors in order to determine environmental and user dynamic context (i.e., if the collector device 100 is indoors/outdoors, traveling up a staircase, traveling in an elevator, walking, traveling in a vehicle, etc.). Once the environmental and user dynamic context information has been determined, collector device 100 may then transmit this information to server 103. Server 103 may then adjust (i.e. correct) the locations of the access points based on map information. For example, the known locations (e.g. latitude and longitude) of the stairs, elevator, etc. may be used by the server device 103 as anchors in determining the locations of the access points.

Figure 1C:
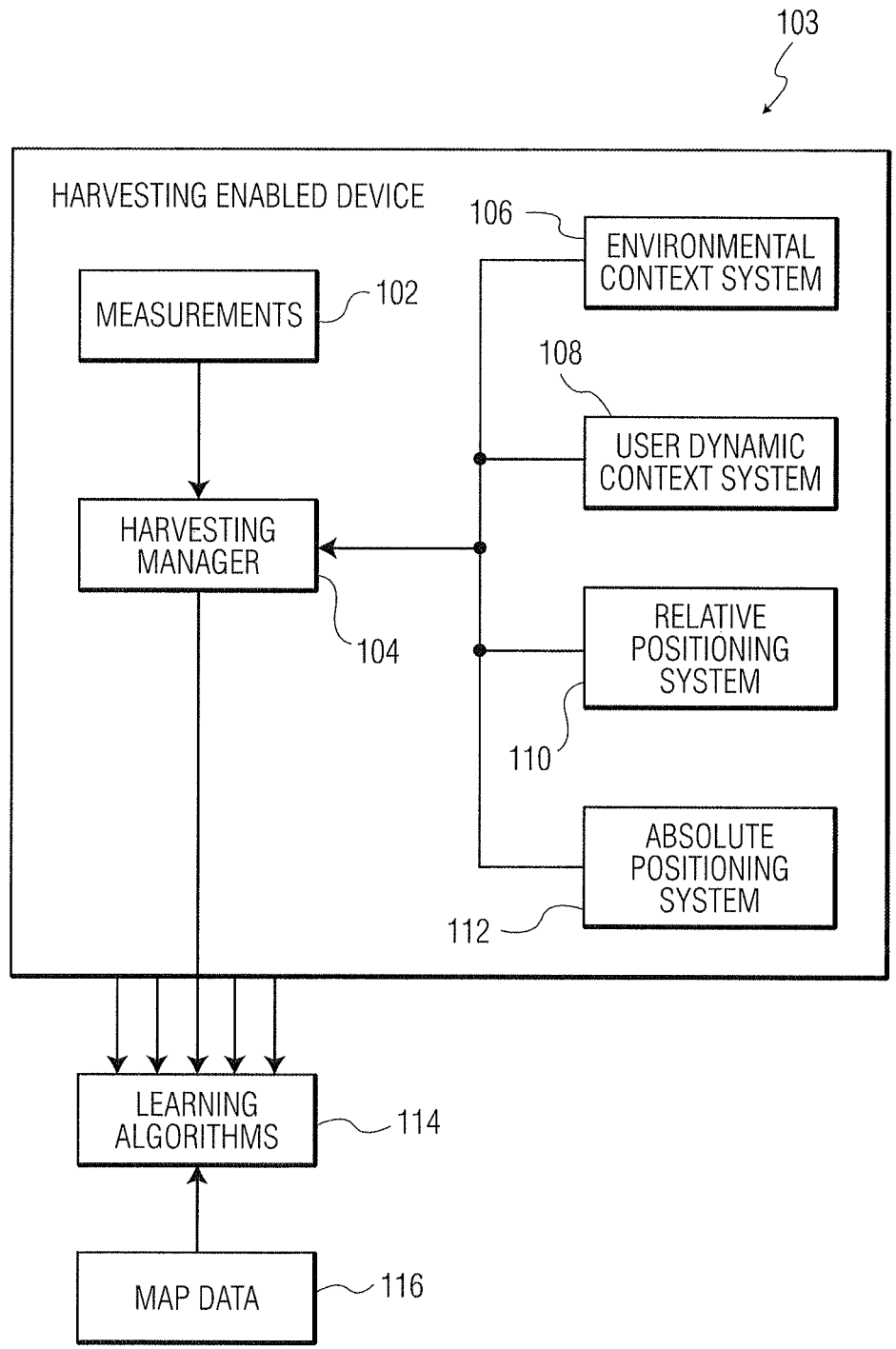
FIG. 1C is a block diagram of a processor in the server device, according to an embodiment of the present invention.

An embodiment of server 103 is shown in FIG. 1C where hardware and/or software modules may be implemented to determine the locations of the access points. Specifically, processor 120 may have module 102 for processing the measurements received from the internal sensors of collector device 100, environmental context system 106 for determining environmental context of the device (e.g., whether the device is indoors or outdoors), user dynamic context system 108 for determining traveling dynamics of the user (e.g., whether the user is traveling upstairs, in an elevator, in a vehicle, etc.), relative positioning system 110 for determining the relative position to the access points from the collected measurements and context data, absolute positioning system 112 for determine the absolute position, for example, based on the GPS signals, harvesting manager 104 which determines the locations of the access points, learning algorithm module 114 which combines the harvesting information with the map information from map data module 116 in an attempt to correct the locations of the access points. Although the server device 103 is shown as being separate from collector device 100, it is contemplated that collector device 100 could perform all of the functions of server device 103.

In one example, harvesting manager 104 may determine locations for a plurality of access points within a building. In order to obtain a better estimate of the access point locations, the learning algorithm correlates the environmental and user dynamic context information that has been determined within the building with associated map data that may be used as an anchor within the building.

For example, measurement module 102 may receive accelerometer measurements from collector device 100 indicating that collector device 100 is accelerating in a vertical direction. The environmental and user dynamic context modules 106 and 108 may then determine that the user is riding in an elevator within the building. The learning algorithm then utilizes this environmental and user context information to extract specific map data (i.e., the latitude and longitude) of the elevator which may be known due to architectural drawings of the building. Learning algorithm module 114 may then utilize this map information to adjust the estimated locations of the access points relative to the newly found absolute anchor position within the building. If multiple elevators are present, the learning algorithm may utilize the elevator closest to the estimated position.

Figure 2A:
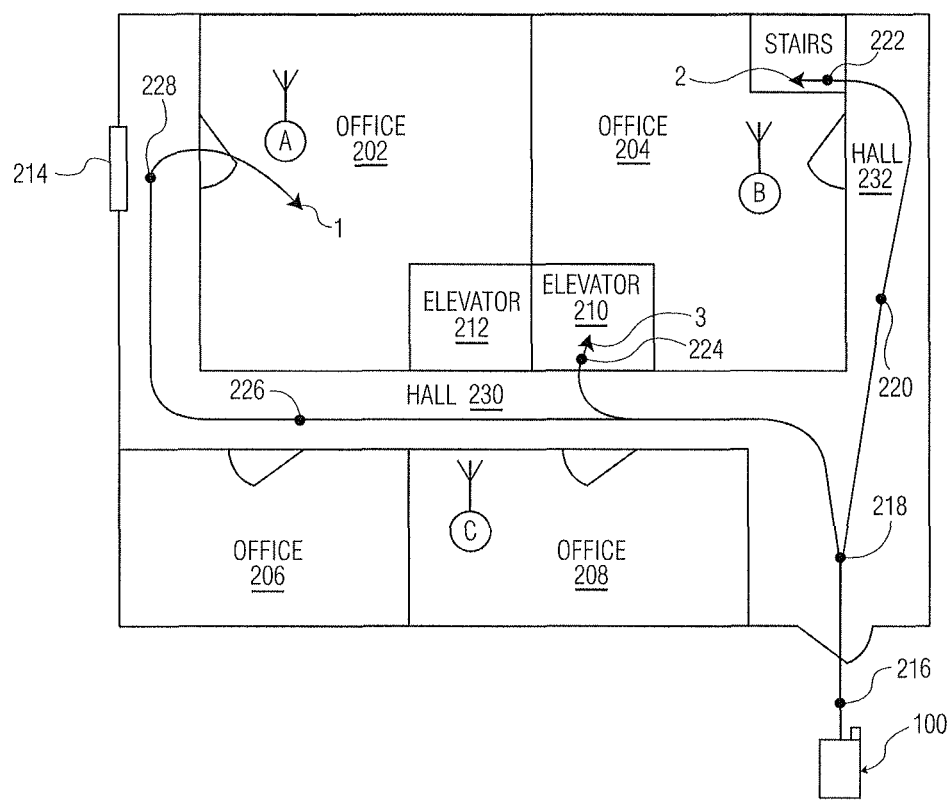
FIG. 2A is an architectural view of an office building through which the collector device and access points are located, according to an embodiment of the present invention.
Figure 2B:
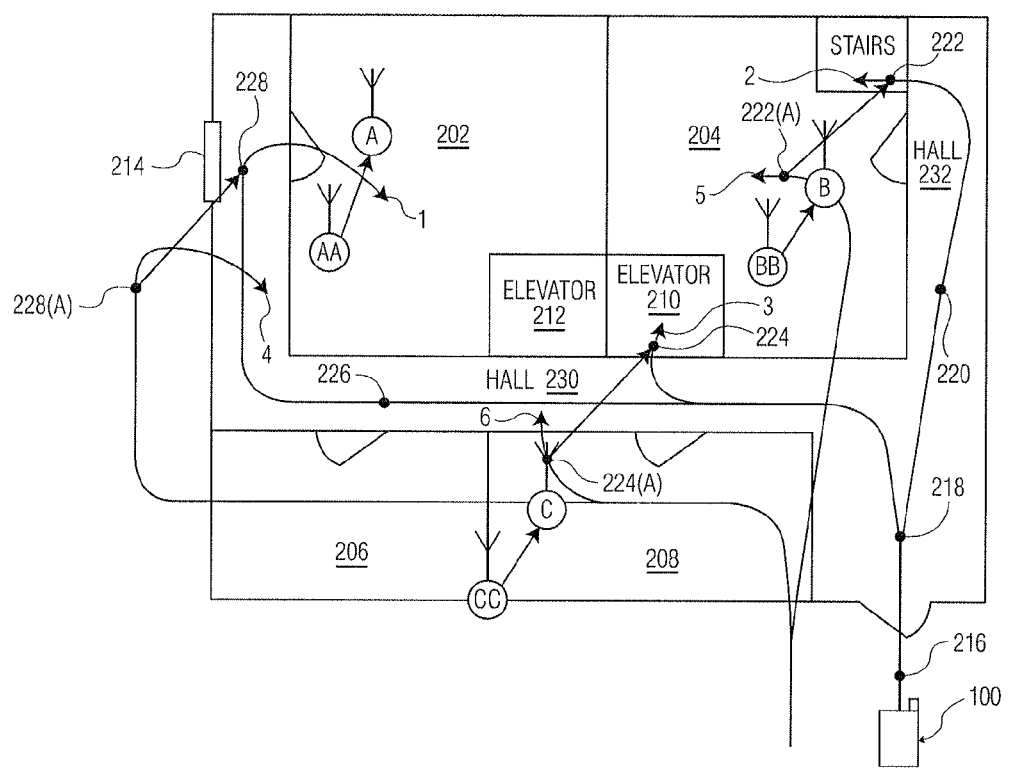
FIG. 2B is an architectural view of the office building through which the collector device and access points are located, and showing pattern matching, according to an embodiment of the present invention.

FIGS. 2A and 2B show various examples of collector device 100 traveling through an office building. Specifically, collector device 100 may travel along three different paths, 1, 2 and 3.

In operation, collector device 100 may determine its absolute position (i.e. initial anchor) using a GPS signal at position 216 before entering the office building. Once collector device 100 enters the building, GPS signals may no longer be received or may no longer be accurate due to multipathing and signal fading. The position of collector device 100 may then be determined based on a combination of dead reckoning sensors (e.g. accelerometers) and relative strengths of the signals transmitted from the Wi-Fi access points A, B and C located in offices 202, 204 and 208 respectively.

In general, server 103 attempts to estimate the locations of the access points based on information received from the collector device. In one example, collector device 100 may travel along pathway 1. Along pathway 1, collector device 100 may determine its position at various points 218, 226 and 228 while the user is traveling through hallway 230. At these points, collector device 100 may measure signal characteristics of the access point RF signals and position displacements from previous positions along the path. These measurements and computations are then sent to server 103 where the locations of the access points are estimated and sent back to the collector device 100 for positioning purposes.

A similar process for estimating the position of collector device 100 and the position of access points A, B and C may be performed on paths 2 and 3 through the building. Although it is shown that measurements may be taken at points 218, 226, 228, 224, 220 and 222, it is contemplated that the measurements may be performed more frequently to obtain a more accurate estimate of the path.

As described above, collector device 100 has internal sensors which are utilized in an attempt to determine environmental and user based context information within the building. On path 1 for example, (at position 228), a camera on collector device 100 may detect natural light being transmitted through window 214. This information may then be utilized by collector device 100 to determine that it is in proximity to window 214 (i.e. the window closest to the estimated position of collector 100). Since the location (e.g., latitude and longitude) of window 214 may be known due to architectural drawings of the building, server 103 (upon receiving the information from the collector device) may adjust the position of the access points by some corrective distance. Once the position of the access points has been corrected, this information is then sent to the collector device, thereby allowing the collector device to better estimate its own location.

On path 3, the accelerometer within collector device 100 may detect that the user is riding an elevator 210 at estimated position 224. Since the location of the elevators may also be known based on architectural drawings of the building, the position of access points A, B and C may be adjusted by the server 103.

In another example, (when collector device 100 is traveling along path 2), the accelerometer may also detect at point 222 that the user is walking up a staircase. Since the location of the stairs is also known in the architectural drawings, then the stairs may also become an absolute positioning anchor. Thus, server 103 may adjust the position of access points A, B and C.

If indoor anchors are not utilized, locations of the access points may be skewed and therefore locations 218, 220, 224, 226 and 228 of the collector device path may be skewed. For example position 228 may be improperly displayed in office 202 rather than in the hallway where it actually is located.

Additional anchors help correct this skew. Thus, locations of the access points may be adjusted based on one or more of the anchors so that they more accurately coincide with the stairs 222, elevator 210 and window 214 respectively. This then allows the collector device to correct the position measurements along the path. In general, the locations of access points may be more accurately estimated, therefore resulting in a more accurate estimation of the location of the collector device along the paths.

Correcting access point locations and paths 1, 2 and 3 based on the anchors is illustrated in FIG. 2B. In FIG. 2B, the paths initially computed by collector device 100 may be illustrated as alternate paths 4, 5 and 6. The locations of the access points may also be initially determined as alternate access point locations AA, BB and CC. Thus, although collector device 100 is traveling down the respective hallways on actual paths 1, 2 and 3, the collector device 100 incorrectly estimates its path trajectory. This is due to the incorrect estimate of the access point locations.

However, if anchors at window 214, elevator 210 and stairs 222 are determined by collector device 100, the estimated positions of the access points may be corrected by server 103 (e.g. AA may be adjusted to A, BB may be adjusted to B and CC may be adjusted to C). Similarly, since the access point locations are corrected, the alternate trajectories 4, 5 and 6 may be adjusted to their correct locations (e.g., 228A may be adjusted to 228, 224A may be adjusted to 224 and 222A may be adjusted to 222, etc.).

Although the individual locations of anchors 228, 224 and 222 are utilized to correct the access point locations, and ultimately the trajectory of the collector device, it also contemplated that pattern matching may be performed based on the overall layout of the hallway. The server 103 may utilize the architectural layout of the building, such as the general flow of the hallway, in order to adjust the trajectory of collector device 100.

For example, in FIG. 2B the system may initially estimate the locations of the access points and trajectories 4, 5 and 6. It is obvious, however, from the map data, that the access points are located in odd positions, and that the trajectories are incorrectly traveling through office walls when they should be flowing through the halls 230 and 232. Thus, the use of this pattern information with or without anchor information may be utilized to shift the overall trajectories and the access point locations so that they fall in reasonable positions.

This pattern matching can be performed by the server 103 laying the trajectories over the map data. The trajectories may then be compared to other possible trajectories. The best possible match may then be determined as the solution. For example, paths 4, 5 and 6 may be correlated with other selected potential paths (i.e. paths that are deemed relevant). Since paths 4, 5 and 6 have an overall relative shape similar to possible paths 1, 2 and 3 (i.e. high correlation), a match is determined (i.e., the overall flow of paths 4, 5 and 6 correlates well with potential paths 1, 2 and 3 through the hallways). Thus, both pattern matching and absolute anchors within the building may be determined based on map information (patterns or known locations within the building).

In one example, multiple paths of multiple collector devices may also be determined. These paths may then be combined in a statistical manner to smooth the path prior to shifting based on the map information (i.e. prior to correlation in pattern matching). Smoothing may make it easier to determine a match between the collector path and a potential path within the building.

Although FIGS. 2A and 2B are two-dimensional drawings and two-dimensional trajectories with respect to the building, it is contemplated that three-dimensional architectural drawings as well as three-dimensional trajectories may be determined. This allows for a three-dimensional map of the wireless access points in the building to be accurately determined.

In general, once the positions of the access points within the building have been accurately determined, collector device 100 and other collector devices may be able to accurately determine their position as they navigate through the building.

It is also contemplated that a plurality of other collector devices may also be utilized to perform and share measurements with respect to the access points in an ad-hoc manner without the use of a centralized server (i.e. the collector devices determine the locations of the access points). The plurality of collector devices may then also average or perform some statistical computation on the computed locations of the access points and/or trajectories to determine overall more accurate locations.

Figure 3:
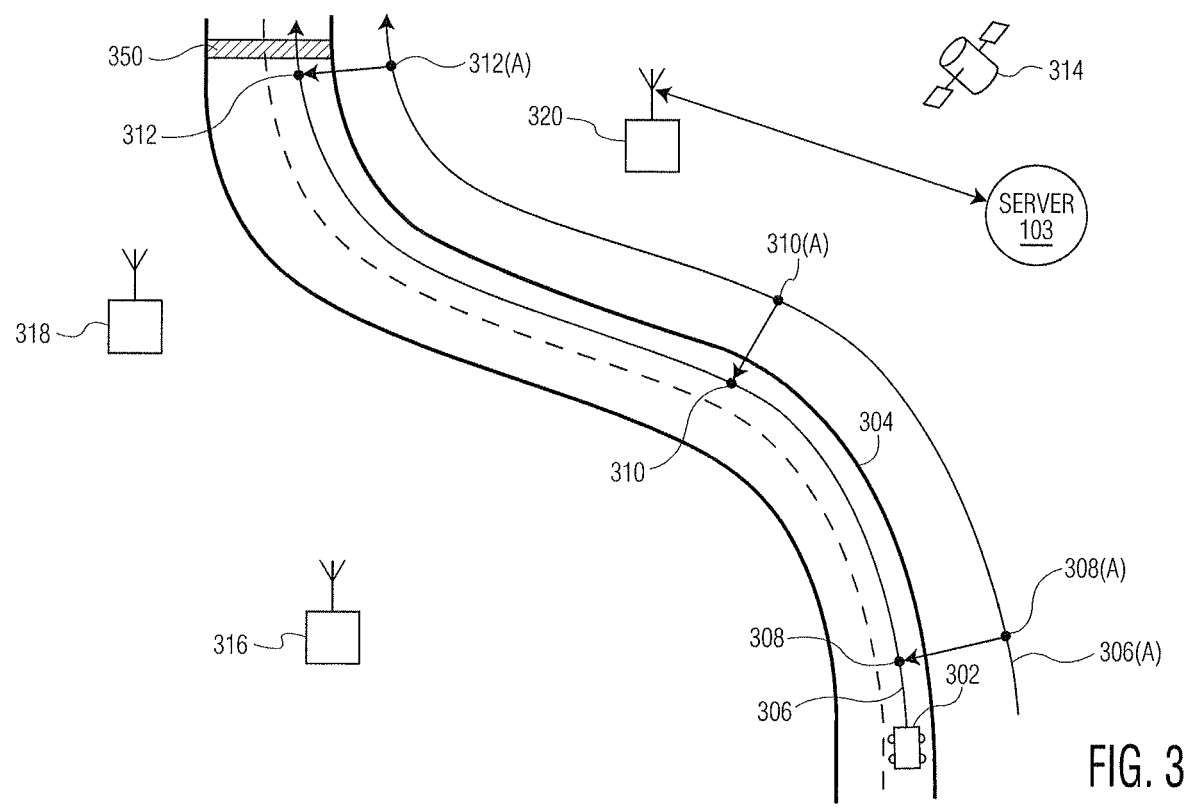
FIG. 3 is map view of a road on which the collector device is traveling and near which the access points are located, according to an embodiment of the present invention.

Although FIGS. 2A and 2B discuss an indoor scenario, it is also contemplated that a similar algorithm can be utilized in an outdoor scenario. For example, as shown in FIG. 3, a vehicle 304 may include a user carrying a collector device 100. The user may be traveling in a vehicle down roadway 304 along path 306. Along path 306, collector device 100 within the vehicle may estimate its location when the vehicle is at positions 308, 310 and 312 all along path 306. This may be performed by absolute positioning via GPS satellites 314 or when GPS is not available/not accurate enough, the positioning may be determined based on access points 316, 318 and 320 in a similar manner to those shown in FIGS. 2A and 2B. Access points 316, 318 and 320 may be Wi-Fi or Wi-Max access points in businesses and residences, cell phone towers or other radio towers that are in transmission proximity to the roadway. The absolute locations of access points 316, 318 and 320 may or may not be known.

Assuming that the locations of access points 316, 318 and 320 are unknown, the collector device 100 may measure RF signals transmitted from the access points, and transmit those measurements to server 103 in an attempt to determine absolute anchor points along the roadway. Since the location of the access points may not be known, the location of positions of 308, 310 and 312 may be incorrectly estimated as 308A, 310A and 312A. However, if server 103 is able to utilize other absolute anchors on the roadway, then the positions 308A, 310A and 312A may be corrected.

In one example, an anchor at position 308 may be determined when the collector device 100 is able to receive a GPS signal and perform a GPS position fix. However, GPS may not always be available or accurate for various reasons. For example, in an urban environment, multipath may affect the accuracy of a GPS measurement.

However, at position 310, collector device 100 may come in close enough proximity to access point 320 to determine the access point identification. The access point's identification may indicate that it is a business such as a fast food restaurant. This identification information as well as received RF signal information may be sent to server 103. Since the location of the fast food restaurant may be found on a map or in a telephone directory, server 103 may set the location of access point 320 as an absolute anchor. As a vehicle travels further down path 306, it may approach tollbooth 350 at position 312. At position 312, a tollbooth may have a rumble strip on the roadway which may be detected by an accelerometer in collector device 100. Collector device 100 may then determine that it is at tollbooth 350 which has a location on the map known by server 103. Thus, tollbooth 350 may also be utilized as an absolute anchor.

In this example, collector device 100 may have three absolute anchors that it has detected (anchor 308 based on a GPS fix, access point 320 which is a known location of a fast food restaurant and tollbooth 350 which has a known location on the map). These anchors allow server 103 to better estimate the position of access points 316 and 318 even if the access points are Wi-Fi transmissions from private residences with unknown map locations. Based on the accurate estimation of access points 316, 318 and 320 (transmitted by the server 103), the collector is able to correct trajectory 306A to a more accurate trajectory 306 (308A is corrected to 308, 310A is corrected to 310 and 312A is corrected to 312).

Similar to the indoor example, the server 103 may also perform pattern matching outdoors. For example, if 306A is the estimated trajectory of the vehicle, the system may correlate trajectory 306A to a possible trajectory 306 onto the roadway. Since the server 103 knows that collector device 100 is traveling in a vehicle (i.e. user context data), it estimates that the trajectory should probably be on the roadway. Since the correlation between trajectories 306A and 306 is relatively high, a match is determined and the trajectory is moved onto the proper roadway.

In general, in both the indoor and outdoor examples, the map data (i.e., the architectural drawings of the buildings, the roadway maps, etc.) have various landmarks with known locations. If collector device 100 is able to identify these various landmarks utilizing internal sensors or a transceiver, then server 103 is able to form an absolute anchor. The absolute anchor may then be utilized by server 103 to correct the estimated locations of the access points which are then ultimately used to correct the estimated location of collector device 100.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for determining locations of a plurality of stationary radio frequency (RF) signal sources that are stationary relative to a mobile collector device, the method comprising:
   receiving, by the mobile collector device, RF signals from the stationary RF signal sources;
   estimating, by a server device, the locations of the stationary RF signal sources based on the received RF signals received by the mobile collector device;
   determining, by the server device, a location of an architectural anchor, proximate to the mobile collector device, the architectural anchor having a fixed absolute location identified by map data independent of any movement of the stationary RF signal sources and the mobile collector device; and
   adjusting, by the server device, the estimated locations of the stationary RF signal sources based on the determined fixed absolute location of the architectural anchor.

2. The method of claim 1,
   wherein the RF signal sources are transmitting the RF signals from indoor locations.

3. The method of claim 1,
   wherein the RF signal sources are transmitting the RF signals from outdoor locations.

4. The method of claim 1,
   wherein the mobile collector device identifies the architectural anchor based on environmental measurements measured by sensors included in the mobile collector device.

5. The method of claim 1, including
   receiving, by the server device, environmental context information indicating that the mobile collector device is located indoors, outdoors or transitioning between indoors and outdoors, the environmental context information including at least one of global navigation satellite system (GNSS) information from a GNSS receiver of the mobile collector device, or sensor information from a sensor of the mobile collector device;
   receiving, by the server device, user context information indicating a mode of travel of the mobile collector device; and
   adjusting, by the server device, the fixed absolute location of the architectural anchor based on the environmental context information and the user context information.

6. The method of claim 1,
   wherein the locations of the RF signal sources are adjusted by computing maximum likelihood locations based on the locations of the RF signal sources and the fixed absolute location of the architectural anchor, by minimizing a cost function that is initialized by weighted centroid estimates of the locations of the stationary RF signal sources.

7. The method of claim 1,
   wherein the mobile collector device computes a location of the mobile collector device based on the adjusted locations of the RF signal sources received from the server device.

8. The method of claim 5, including
   using, by the mobile collector device, signals from at least one of the GNSS receiver or the sensor in the mobile collector device to detect at least one of a user of the mobile collector device being in an elevator, on a staircase, in proximity to a window of a building and in a vehicle traveling on a road as at least one of the environmental context information and the user context information transmitted to the server device.

9. The method of claim 1,
   determining, by the server device, the locations of the RF signals sources and the architectural anchor based on data collected by other mobile collector devices.

10. A method for determining locations of a plurality of stationary radio frequency (RF) signal sources that are stationary relative to a mobile collector device, the method comprising:
    receiving, by the mobile collector device, RF signals from the stationary RF signal sources;
    estimating, by a server device, the locations of the stationary RF signal sources based on the received RF signals received by the mobile collector device;
    determining, by the server device, a location of an architectural anchor having a fixed absolute location identified by map data independent of any movement of the stationary RF signal sources and the mobile collector device;
    determining, by the server device, a trajectory of the mobile collector device over a time period based on the estimated locations of the stationary RF signal sources; and adjusting, by the server device, the estimated locations of the stationary RF signal sources based on the determined fixed absolute location of the architectural anchor and the trajectory.

11. The method of claim 10, including
determining, by the server device, a trajectory associated with map data to compare with the trajectory of the mobile collector device.

12. The method of claim 11,
wherein the trajectory associated with the map data is determined based on an architectural schematic of the interior of a building in which the RF signal sources and the mobile collector device are located.

13. The method of claim 11,
wherein the trajectory associated with the map data is determined based on a map of a probable roadway in proximity to the location of the mobile collector device.

14. The method of claim 11, including
averaging the trajectory of the mobile collector device with other trajectories of other mobile collector devices; and
matching the average trajectory to the trajectory associated with map data.

15. The method of claim 11,
wherein each of the trajectory and the trajectory associated with the map data is at least one of a 2 dimensional outdoor trajectory and a 3 dimensional indoor trajectory.

16. The method of claim 11, including
correlating the trajectory of the mobile collector device with the trajectory associated with the map data to determine a match; and
adjusting the determined locations of the stationary RF signal sources based on the trajectory associated with the map data that best matches the trajectory of the mobile collector device.

17. The method of claim 10, including
determining a plurality of trajectories associated with map data;
selecting one of the plurality of trajectories that best matches the trajectory of the mobile collector device; and
adjusting the determined locations of the stationary RF signal sources based on the selected trajectory.

18. The method of claim 10, including
adjusting the locations of the stationary RF signal sources by minimizing a cost function to compute maximum likelihood locations based on the locations of the stationary RF signal sources and the fixed absolute location of the architectural anchor.

19. The method of claim 18,
wherein the cost function for computing the maximum likelihood locations is initialized by weighted centroid estimates of the locations of the stationary RF signal sources.

20. The method of claim 19,
wherein the weighted centroid estimates are computed based on received RF signal characteristics at points along the trajectory of the mobile collector device.

* * * * *